(12) United States Patent
Kim

(10) Patent No.: US 12,311,801 B2
(45) Date of Patent: May 27, 2025

(54) ENERGY STORAGE SYSTEM EMPLOYING BATTERY PACKS

(71) Applicant: Yong Chul Kim, Seoul (KR)

(72) Inventor: Yong Chul Kim, Seoul (KR)

(*) Notice: Subject to any disclaimer, the term of this patent is extended or adjusted under 35 U.S.C. 154(b) by 572 days.

(21) Appl. No.: 17/669,627

(22) Filed: Feb. 11, 2022

(65) Prior Publication Data

US 2022/0185148 A1   Jun. 16, 2022

Related U.S. Application Data

(63) Continuation of application No. PCT/KR2021/014768, filed on Oct. 21, 2021.

(30) Foreign Application Priority Data

Dec. 16, 2020   (KR) .................. 10-2020-0176761

(51) Int. Cl.

| | |
|---|---|
| *B60L 58/22* | (2019.01) |
| *B60L 53/62* | (2019.01) |
| *B60L 58/12* | (2019.01) |
| *B60L 58/16* | (2019.01) |
| *B60L 58/20* | (2019.01) |
| *H02J 3/32* | (2006.01) |
| *B60L 53/68* | (2019.01) |

(52) U.S. Cl.
CPC ............ *B60L 58/22* (2019.02); *B60L 53/62* (2019.02); *B60L 58/12* (2019.02); *B60L 58/16* (2019.02); *B60L 58/20* (2019.02); *H02J 3/32* (2013.01); *B60L 53/68* (2019.02); *B60L 2210/10* (2013.01); *B60L 2210/30* (2013.01)

(58) Field of Classification Search
CPC ........................................ H02J 58/22
USPC ......................................... 320/125
See application file for complete search history.

(56) References Cited

U.S. PATENT DOCUMENTS

2016/0126741 A1   5/2016   Ito
2020/0127458 A1*  4/2020   Kato ............... H01M 10/425

FOREIGN PATENT DOCUMENTS

| JP | 2014003771 A | 1/2014 | |
|---|---|---|---|
| KR | 1020170007960 A | 1/2017 | |
| KR | 1020180049545 A | 5/2018 | |
| KR | 101925496 B1 * | 12/2018 | ............... H02J 3/32 |
| KR | 1020200048913 A | 5/2020 | |

* cited by examiner

*Primary Examiner* — Edward Tso
*Assistant Examiner* — Ahmed H Omar
(74) *Attorney, Agent, or Firm* — Dinsmore & Shobl LLP; Yongsok Choi, Esq.

(57) ABSTRACT

The present invention relates to an energy storage system employing battery packs, comprising: battery packs; DC/DC power conversion units for adjusting magnitudes of charge/discharge power of the battery packs; an AC/DC power conversion unit for converting discharge power from the DC/DC power conversion units into AC power provided to a grid, or convert charge power from the grid into DC power provided to the DC/DC power conversion units; and an integrated control unit for individually controlling the DC/DC power conversion units on the basis of state information and additional information of the battery packs, and rated power of the AC/DC power conversion unit, wherein the integrated control unit individually controls the DC/DC power conversion units to minimize differences between full charge or discharge times of the battery packs.

5 Claims, 12 Drawing Sheets

| Manufacturer | Model | Battery voltage | Battery capacity | Maximum output | Energy |
|---|---|---|---|---|---|
| Hyundai | Kona | 352.8 | 180 | 100 | 63.5 |
| | Ioniq | 319.4 | 120 | 100 | 38.3 |
| Kia | Niro | 356 | 180 | 100 | 64.1 |
| | Soul | 356 | 180 | 100 | 64.1 |

ENERGY STORAGE SYSTEM EMPLOYING BATTERY PACKS

CROSS-REFERENCE TO RELATED APPLICATION(S)

This application is a continuation application of Patent Cooperation Treaty (PCT) International Application No. PCT/KR2021/014768 filed on Oct. 21, 2021, which claims priority to Korean Patent Application No. 10-2020-0176761 filed on Dec. 16, 2020. The entire contents of PCT Application No. PCT/KR2021/014768 and Korean International Patent Application No. 10-2020-0176761 are hereby incorporated by reference.

FIELD OF THE INVENTION

The present invention relates to an energy storage system (ESS) employing battery packs used in electric vehicles (EVs), and more particularly, to an ESS that stores energy using battery packs used in and extracted from EVs.

BACKGROUND

With the growth of EV industry, industry of reusing and recycling batteries used in EVs (or spent EV battery packs) is regarded as being very important in the circulation structure of the current secondary battery industry, because energy storage enabled by battery technology may be used for various purposes, and internal raw materials of the batteries may be recovered and recycled.

In particular, batteries used in EVs are gradually entering the category of reuse industry, and various research institutes and companies are participating in researches for various techniques or methods that may be used for ESSs. There is a trend of developing methods for analyzing the states of the batteries to classify and use the batteries by their lifetimes and characteristics. In South Korea, the government and specialized institutions are expecting and preparing for the sequential use of spent EV batteries of early EV models in the reuse market from around the year of 2021.

The rear industry of ESSs employing spent EV battery packs is expected to be further accelerated with the growth of the EV market.

If spent EV battery packs (or spent batteries) are reused for a conventional ESS as EVs are widely used, the classification and analysis of the respective batteries may have limitations.

Combinations of spent EV battery packs used in different environments exhibit different charge and discharge characteristics due to their different SOH states. That is, when various spent EV battery packs with different energy capacity are installed and used in one ESS, there is a need for an output control technique that can reflect the characteristics of each of the spent EV battery packs, even if one or more spent EV battery packs are connected and operated regardless of the states of the spent EV battery packs.

When spent EV battery packs in different SOH states are not classified and used for an ESS, the charge and discharge characteristics of the spent EV battery pack with the lowest SOH will be followed by the remaining spent EV battery packs. The remaining amount of charge or discharge is indicated by a state of health (SOH) (i.e., the number of times of use). For example, assuming that a spent EV battery pack with 100% SOH can be used 5,000 times and an amount of time required for full charge from full discharge (or for full discharge from full charge) is one hour, the battery pack with 50% SOH can be used 2,500 times and the amount of time required for charge or discharge is reduced to 30 minutes. Thus, when spent EV battery packs with 100% SOH and 50% SOH are applied to an ESS, the batteries with 100% SOH generally follows the operating characteristics according to charge and discharge of the batteries with SOH 50%, and can be only used for up to about 30 minutes till full charge or full discharge, which limits the efficiency of operation. Therefore, in order to reuse one or more spent EV battery packs, there is a need for a method for efficiently using spent EV battery packs with different shapes and specifications and/or spent EV battery packs with different SOH states when they are used for an ESS, which is a very important technique in the ESS reuse industry.

As an ESS for solving this problem, Korean Patent Application No. 10-2018-0131558 discloses a waste battery-based ESS. The ESS is configured to monitor the state of each of waste batteries, sequentially charge the waste batteries from the batteries with low energy storage capacity, and discharge all of the waste batteries at once when the batteries are discharged.

Although the above patent application can solve the problem that a battery cannot be fully charged when another battery is fully charged, there is still a problem that charging takes a longer time since the charging is sequentially performed from the batteries with low energy storage capacity.

SUMMARY OF THE INVENTION

An energy storage system according to one embodiment of the invention comprises: a plurality of battery packs; a plurality of DC/DC power conversion units configured to adjust magnitudes of charge power and discharge power of each of the plurality of battery packs; an AC/DC power conversion unit configured to convert discharge power discharged through the plurality of DC/DC power conversion units into AC power and provide the AC power to a grid or a load, or convert charge power coming from the grid into DC power and provide the DC power to the plurality of DC/DC power conversion units; and an integrated control unit configured to individually control the plurality of DC/DC power conversion units on the basis of state information including a state of charge (SOC) and a state of health (SOH) of each of the plurality of battery packs, additional information including a maximum allowable charge/discharge output level of each of the plurality of battery packs, and rated power of the AC/DC power conversion unit, wherein the integrated control unit is configured to individually control the plurality of DC/DC power conversion units to minimize differences between full charge times or full discharge times of the plurality of battery packs.

According to one embodiment of the invention, the integrated control unit comprises: a state information acquisition unit configured to acquire the state information and additional information of each of the plurality of battery packs, and the rated power of the AC/DC power conversion unit; a charge/discharge power calculation unit configured to calculate the charge/discharge power of each of the plurality of battery packs on the basis of the state information and additional information of each of the plurality of battery packs, and the rated power of the AC/DC power conversion unit; and a charge/discharge power control unit configured to control the plurality of DC/DC power conversion units on the basis of the calculated charge/discharge power of each of the plurality of battery packs.

According to one embodiment of the invention, the charge/discharge power calculation unit comprises: a chargeable/dischargeable time calculation unit configured to calculate a chargeable/dischargeable time of each of the plurality of battery packs on the basis of the SOH and SOC of each of plurality the of battery packs; a chargeable/dischargeable reference time determination unit configured to determine a longest chargeable/dischargeable time among the chargeable/dischargeable times of the plurality of battery packs as a chargeable/dischargeable reference time; a charge/discharge ratio calculation unit configured to calculate a charge/discharge ratio of each of the plurality of battery packs by dividing the chargeable/dischargeable time of each of the t plurality of battery packs by the chargeable/dischargeable reference time; a corrected output calculation unit configured to calculate a corrected output level for each of the plurality of battery packs by multiplying the charge/discharge ratio of each of the plurality of battery packs and a value obtained by dividing the rated power of the AC/DC power conversion unit by a sum of the charge/discharge ratios of the plurality of battery packs; a maximum allowable output level determination unit configured to determine whether the corrected output level calculated for each of the plurality of battery packs exceeds the maximum allowable charge/discharge output level determined for each of the plurality of battery packs; and a first charge/discharge power determination unit configured to, in response to determining that the corrected output level of each of the plurality of battery packs does not exceed the maximum allowable charge/discharge output level of each of the plurality of battery packs, determine the corrected output level of each of the plurality of battery packs as the charge/discharge power of each of the plurality of battery packs.

According to one embodiment of the invention, the charge/discharge power calculation unit further comprises: a second charge/discharge power determination unit configured to, in response to determining that the corrected output level of at least one first battery pack among the corrected output levels of the plurality of battery packs exceeds the maximum allowable charge/discharge output level determined for each of the plurality of battery packs, determine the maximum allowable charge/discharge output level of the at least one first battery pack as the charge/discharge power of the at least one first battery pack, and determine a value obtained by adding the corrected output level of at least one second battery pack other than the at least one first battery pack and power corresponding to a difference between the maximum allowable charge/discharge output level and the corrected output level of the at least one first battery pack as the charge/discharge power of the at least one second battery pack.

According to one embodiment of the invention, the integrated control unit is configured to, in response to determining that charge/discharge of at least one third battery pack among the plurality of battery packs is impossible, calculate the charge/discharge power of each of the remaining battery packs other than the third battery pack, and control the plurality of DC/DC power conversion units on the basis of the calculated charge/discharge power of each of the battery packs.

According to the invention, it is possible to secure a technique that may be used for an ESS employing one or more battery packs in different states.

According to the invention, an integrated control function may be used for the ESS regardless of the states of battery packs, so that battery packs used in and extracted from EVS may be reused to contribute to industry vitalization.

According to the invention, battery packs used in and extracted from EVs and applied to the ESS are manufactured and used according to far stricter technical standards than batteries used in a conventional ESS. Further, since a refrigerant cooling method or the like is used, temperature deviations are very small compared to a temperature control method for the batteries used in the conventional ESS, and the battery packs may be operated very close to the normal target temperature of 25 degrees. In addition, the battery packs have a structure that is very strong against shock, and are sealed to be completely waterproof. Therefore, the ESS to which the battery packs are applied may be used for more various purposes than a common ESS, and thus may be applied to a new type of industry.

According to the invention, the ESS may immediately use a battery pack separated and extracted from an EV when only SOH and SOC states measured by a BMS of the EV are identified. Conventionally, after battery packs are separated from EVs, the battery packs are assembled through a complicated process such as measuring the current states of the battery packs and classifying the battery packs by types at an analysis institution or company. In contrast, the ESS according to the invention may be immediately used without such a complicated process. Here, it can be said that there is no technical communication compatibility problem as complementary works on communication matching or the like of the BMS are carried out through discussion with manufacturers.

According to the invention, the ESS employing the battery packs is strong enough to be moved using a truck or the like, and thus may be utilized for various purposes, e.g., for the cases where a portable power source is needed at a construction site or an outdoor event, a portable emergency power source is needed in a building, or a portable independent power source is needed for EV charging.

DETAILED DESCRIPTION OF THE INVENTION

Figure 1:
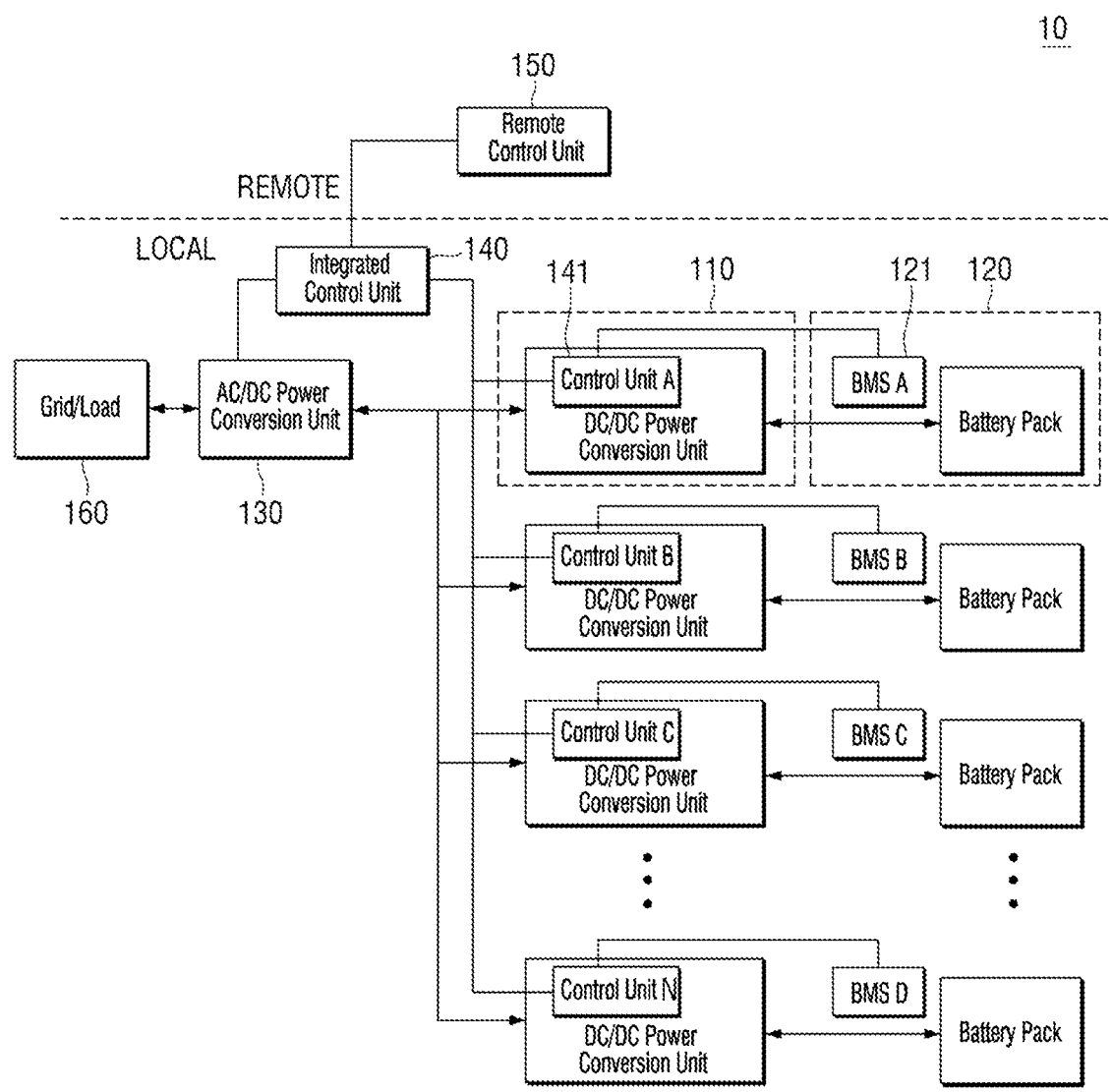
FIG. 1 is a conceptual diagram schematically showing the basic configuration of an energy storage system (ESS) employing battery packs according to one embodiment of the invention.

The drawings accompanying the specification show embodiments of the present invention, and serve to help further understanding of the technical contents of the invention together with the following detailed description of the invention. Thus, the invention should not be interpreted as being limited only to those illustrated in the drawings.

Hereinafter, preferred embodiments of the invention will be described in detail with reference to the accompanying drawings. Prior to the description, it is noted that the terms or words used in the specification and claims should not be construed as being limited to their ordinary or dictionary meanings, but should be interpreted as meanings or concepts consistent with the technical ideas of the invention on the basis of the principle that an inventor may appropriately define the concept of a term in order to best describe his/her invention.

Therefore, the embodiments described in the specification and the configurations shown in the drawings are merely the most preferred embodiments of the invention and do not represent all of the technical ideas of the invention. Thus it should be understood that there may be various equivalents and modifications that can be substituted at the time of filing the present application.

An energy storage system (ESS) employing battery packs according to the invention basically employs battery packs used in electric vehicles (EVs). Specifically, battery packs used in and extracted from EVs are employed. Here, the battery packs may be battery packs in different states having different SOHs and SOCs. According to the invention, the ESS may be configured using battery packs in different states having different SOHs and SOCs.

Further, the present invention may employ one or more batteries that are to be used or in use in EVs. In addition, other types of battery packs may be employed.

FIG. 1 is a conceptual diagram schematically showing the basic configuration of an ESS employing battery packs according to one embodiment of the invention.

Referring to FIG. 1, an ESS 10 employing battery packs according to the invention comprises a plurality of battery packs 120, a plurality of DC/DC power conversion units 110, an AC/DC power conversion unit 130, an integrated control unit 140, and a remote control unit 150.

The battery packs 120 are provided as at least one ESS for storing or supplying power.

According to the invention, the battery packs 120 refer to used battery packs for EVs. Of course, the ESS according to the invention may employ unused battery packs for EVs or battery packs that are not for EVs.

Each of the battery packs 120 is provided with a battery management system (BMS) 121 for managing the battery pack. The BMS 121 is connected with a control unit 141 of the DC/DC power conversion unit 110, and performs a function of providing BMS information to the control unit 141 of the DC/DC power conversion unit 110, or controlling the battery pack 120 under the control of the control unit 141.

Figures 2, 3:
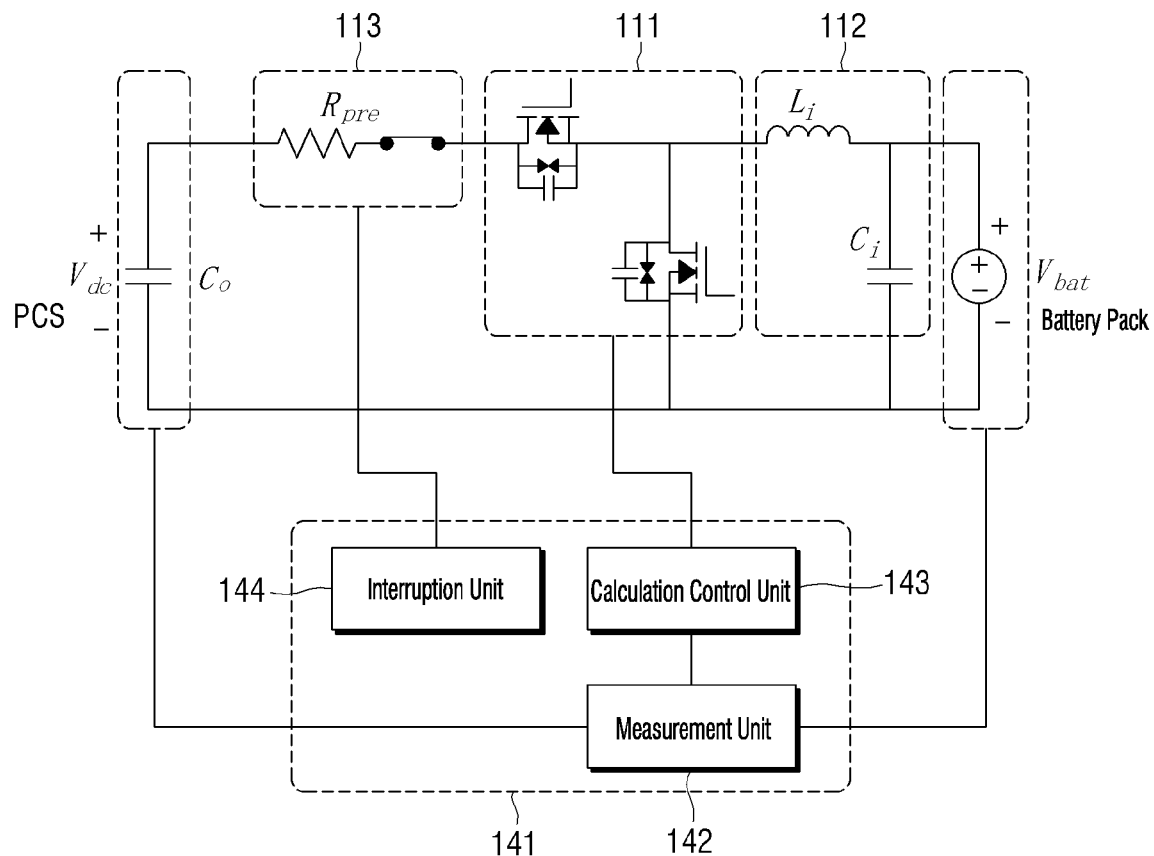
FIG. 2 is a diagram for illustrating the specifications of battery packs for electric vehicles (EVs) that may be applied to the ESS of FIG. 1.
FIG. 3 is a diagram for illustrating the DC/DC power conversion unit shown in FIG. 1.

FIG. 2 is a diagram for illustrating the specifications of battery packs for EVs that may be applied to the ESS of FIG. 1.

The specification data of the battery packs of FIG. 2 are related to specification data disclosed by the EV manufacturers currently in operation. Referring to FIG. 2, it can be seen from the basic specifications of the battery packs of Hyundai and Kia that the ESS is preferably used as an ESS of 100 KW or higher rather than a small ESS because the power of the battery packs may employ an output of about 100 kW.

The battery packs may be battery packs that are to be used, are in use, or have been used in EVs. Therefore, it is highly probable that the plurality of battery packs employed in the ESS according to the invention have different SOC and SOH states.

Therefore, in order to employ the plurality of battery packs 120 in different states, the ESS 10 according to the invention comprises the DC/DC power conversion unit 110 capable of adjusting charge/discharge power in consideration of the state of each of the battery packs 120.

Further, it can be seen that the ESS 10 according to the invention requires the DC/DC power conversion unit 110 because voltage of battery packs used in EVs is about 350V and the AC/DC power conversion unit 130 of 100 kW or higher commonly has DC-side operating voltage of 600V, which is to be met by the DC/DC power conversion unit 110.

More battery pack models for EVs are expected to emerge in the future, and various types of battery packs with higher voltage, output, and energy are expected to emerge. Further, since the ESS 10 according to the invention employs the DC/DC power conversion unit 110, the development of an ESS that reflects the characteristics of various battery packs used in and extracted from EVs may be required.

Because battery packs for vehicles are manufactured according to very strict standards, they are safe from shock or vibration. Therefore, an ESS employing spent battery packs for vehicles may be installed in a transportation means such as a truck to be used as a portable ESS.

The number of the plurality of DC/DC power conversion units 110 corresponds to the number of the plurality of battery packs 120, and the DC/DC power conversion units 110 are connected with the battery packs 120 one to one. Further, the plurality of DC/DC power conversion units 110 are connected with the one AC/DC power conversion unit 130.

The DC/DC power conversion unit 110 is positioned between the battery pack 120 and the AC/DC power conversion unit 130 to convert the magnitude of inputted DC power and output the converted DC power.

Specifically, the DC/DC power conversion unit 110 converts the magnitude of DC-type charge power provided from the AC/DC power conversion unit 130 and provides the converted DC power to the battery pack 120, or converts the magnitude of DC-type discharge power provided from battery pack 120 and provides the converted DC power to the AC/DC power conversion unit 130.

Since the plurality of DC/DC power conversion units 110 are provided and respectively connected with the plurality of battery packs 120, the battery packs 120 may receive or output DC power of different magnitudes, respectively.

FIG. 3 is a diagram for illustrating the DC/DC power conversion unit shown in FIG. 1.

Referring to FIG. 3, the DC/DC power conversion unit comprises a DC/DC module 111, a power filter module 112, a interruption unit module 113, and a control unit 141.

The DC/DC module 111 converts inputted DC power into DC power of a different magnitude and outputs the converted DC power. Further, the power filter module 112 is configured as an RLC or LC circuit to perform a filtering function. The interruption unit module 113 performs a precharge function and a power interruption function.

The control unit 141 controls the DC/DC module 111, the power filter module 122, and the interruption unit module 113. The control unit 141 is connected with the integrated control unit 140 and provides the integrated control unit 140 with information including power of both ends of the battery pack 120, information value of the BMS provided in the battery pack 120, and the like. Further, the control unit 141 controls the DC/DC module 111, the power filter module 122, and the interruption unit module 113 under the control of the integrated control unit 140.

The control unit 141 comprises a measurement unit 142 for measuring the current state of the battery pack 120 and the AC/DC power conversion unit 130, a calculation control unit 143 for performing calculation and control on the basis of the current state, and an interruption unit 144 for interrupting or connecting power when necessary.

The measurement unit 142 may detect the power of both ends of the DC/DC power conversion unit 110, the power of both ends of the battery pack 120, and the like, and read the power value of the AC/DC power conversion unit 130 or the BMS value of the battery pack 120. Further, the measurement unit 142 may measure the above values by various means and methods.

The interruption unit 144 may employ a relay including a precharge function to resolve circuit damage due to overvoltage or overcurrent at the time of turning on. Further, when a battery pack is inoperable due to the occurrence of a problem, the interruption unit 144 may turn off the relay under the control of the calculation control unit 143 to exclude the battery pack, and may turn on the relay and operate the battery pack when the problem is resolved and the normal state is restored.

The DC/DC power conversion module 111, the power filter module 112, and the interruption unit module 113 provided in the DC/DC power conversion unit 110 may also be provided as modules of a common DC/DC power conversion device.

The ESS according to the invention may employ the DC/DC power conversion units 110, which are connected with the battery packs 120 one to one, to individually control charge/discharge power of the battery packs in one or more different states.

The AC/DC power conversion unit 130 is a component corresponding to a power conversion system (PCS) provided in the ESS 10, and performs a function of converting AC power to DC power or converting DC power to AC power. The AC/DC power conversion unit 130 is connected with the plurality of DC/DC power conversion units 110, the grid/load 160, and the integrated control unit 140.

The AC/DC power conversion unit 130 converts DC-type discharge power discharged through the DC/DC power conversion unit 110 into AC-type power and provides the AC-type power to the load 160, or converts AC-type charge power coming from the grid 160 into DC-type power and provides the DC-type power to the DC/DC power conversion unit 110.

Figure 4:
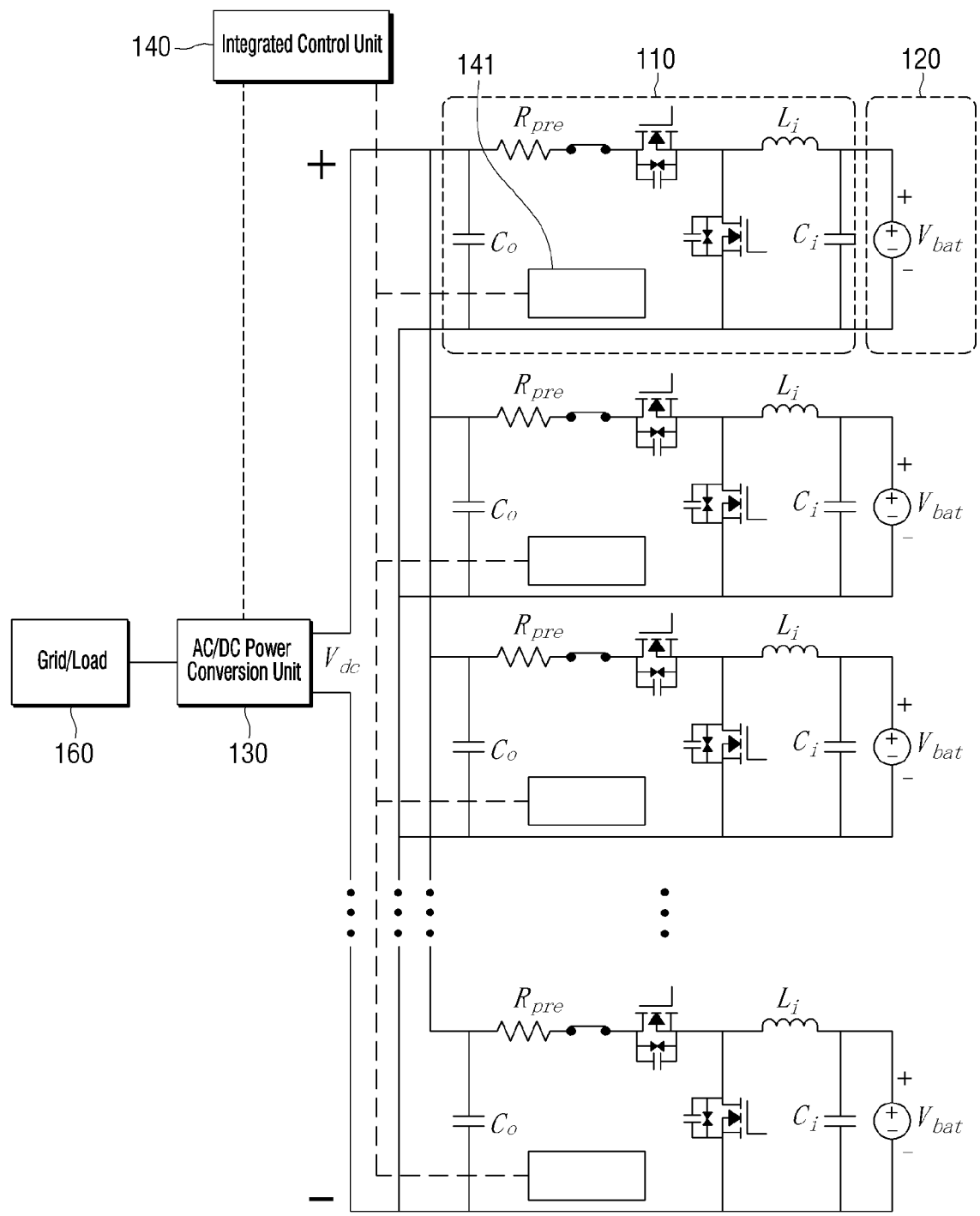
FIG. 4 is a diagram for illustrating a connection relationship between the AC/DC power conversion unit and the control unit of the DC/DC power conversion unit shown in FIG. 1.

FIG. 4 is a diagram for illustrating a connection relationship between the AC/DC power conversion unit and the control unit of the DC/DC power conversion unit shown in FIG. 1.

Referring to FIG. 4, the plurality of DC/DC power conversion units 110 are connected with the one AC/DC power conversion unit 130, and the battery packs 120 are respectively connected with the DC/DC power conversion units.

In the ESS 10 according to the invention, the plurality of DC/DC power conversion units 110 are connected with the one AC/DC power conversion unit 130. The ESS 10 according to the invention may carry out individual output control using the DC/DC power conversion units 110 according to the states of the battery packs 120 in order to meet the output of the AC/DC power conversion unit 130.

For example, when ten battery packs having the same output of 50 kW are connected, the ten battery packs may be used as connected with a PCS for 500 kW in which ten DC/DC converters for 50 kW are connected.

Alternatively, when five battery packs with 30 KW output and five battery packs with 50 kw output are connected, the battery packs may be used as connected with the AC/DC power conversion unit 130 for 400 kW after a DC/DC converter for 50 kW is connected with each battery pack and the output of the five battery packs with 30 kW is adjusted to 30 KW. When a battery pack is added or removed, it is possible to freely add/remove the battery pack by adjusting the output of the DC/DC power conversion unit 110 according to the rated power of the AC/DC power conversion unit 130.

Figure 5:
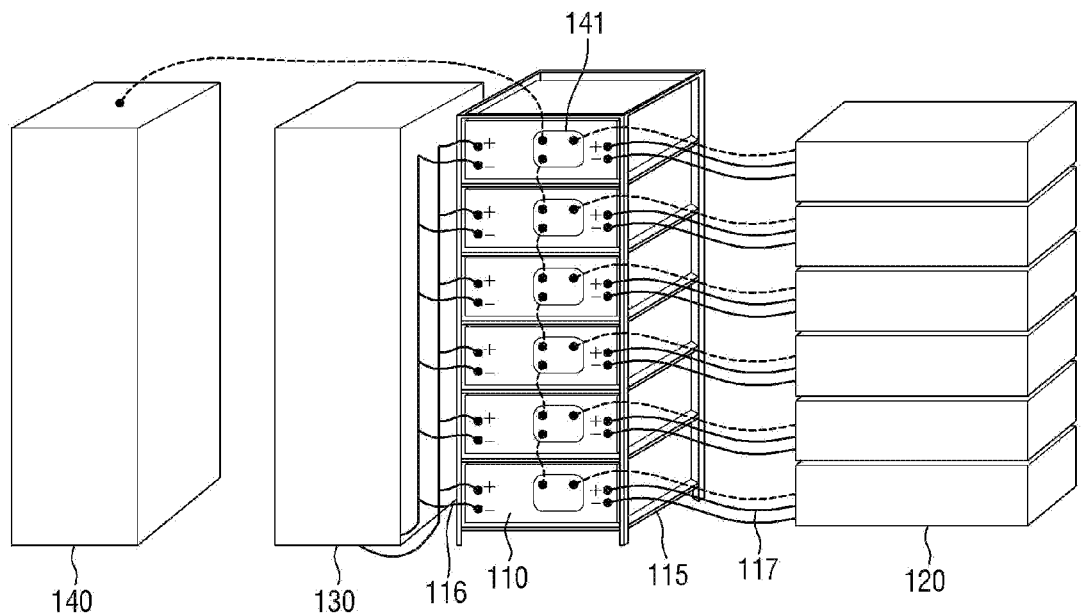
FIG. 5 is a diagram for illustrating a modularized structure of the DC/DC power conversion units shown in FIG. 1.

FIG. 5 is a diagram for illustrating a modularized structure of the DC/DC power conversion units shown in FIG. 1.

Referring to FIG. 5, the plurality of DC/DC power conversion units 110 may be provided in a module form and installed as mounted on an installation rack 115. Here, the control unit 141 is included in each of the DC/DC power conversion units 110.

Each of the plurality of DC/DC power conversion units 110 is connected with the one AC/DC power conversion unit 130 through a DC-BUS power line 116, and each of the plurality of battery packs 120 is connected with the corresponding DC/DC power conversion unit 110 through a DC power line 117. The plurality of DC/DC power conversion units 110 are connected with the AC/DC power conversion unit 130 as connected with each other in parallel.

According to the invention, it is possible to increase the output or capacity of the ESS by simply adding or removing the DC/DC power conversion units 110 in the module form to or from the installation rack 115. The ESS may be configured as necessary in a simple manner by determining the output and capacity of the ESS to be configured, and calculating the unit capacity of the battery packs to identify the required number of the DC/DC power conversion units 110.

Alternatively, the DC/DC power conversion units 110 may be provided as integrally included in the battery packs 120. The battery packs 120 containing the DC/DC power conversion units 110 may be mounted and connected to the ESS regardless of the models and states of the battery packs.

Even if some of the battery packs are dropped out while at least one battery pack is connected and operated, the operation may be continued using the remaining battery packs.

Figure 6:
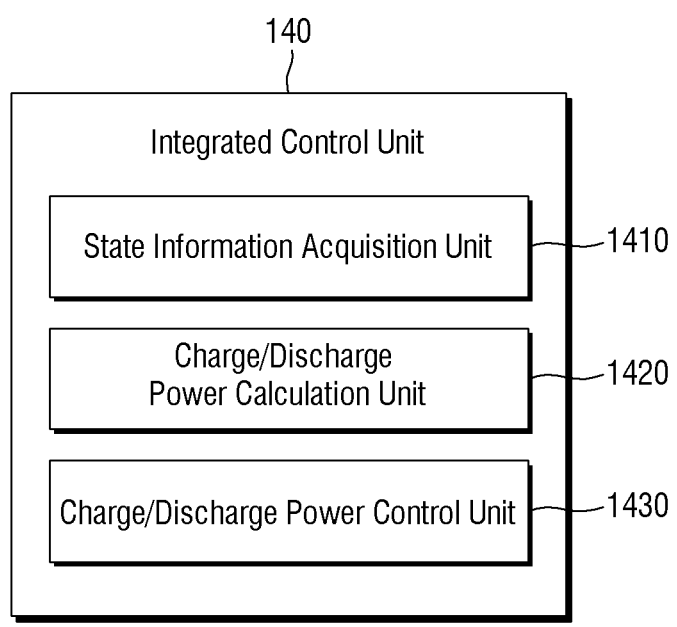
FIG. 6 is a diagram for illustrating the integrated control unit shown in FIG. 1.
Figure 7:
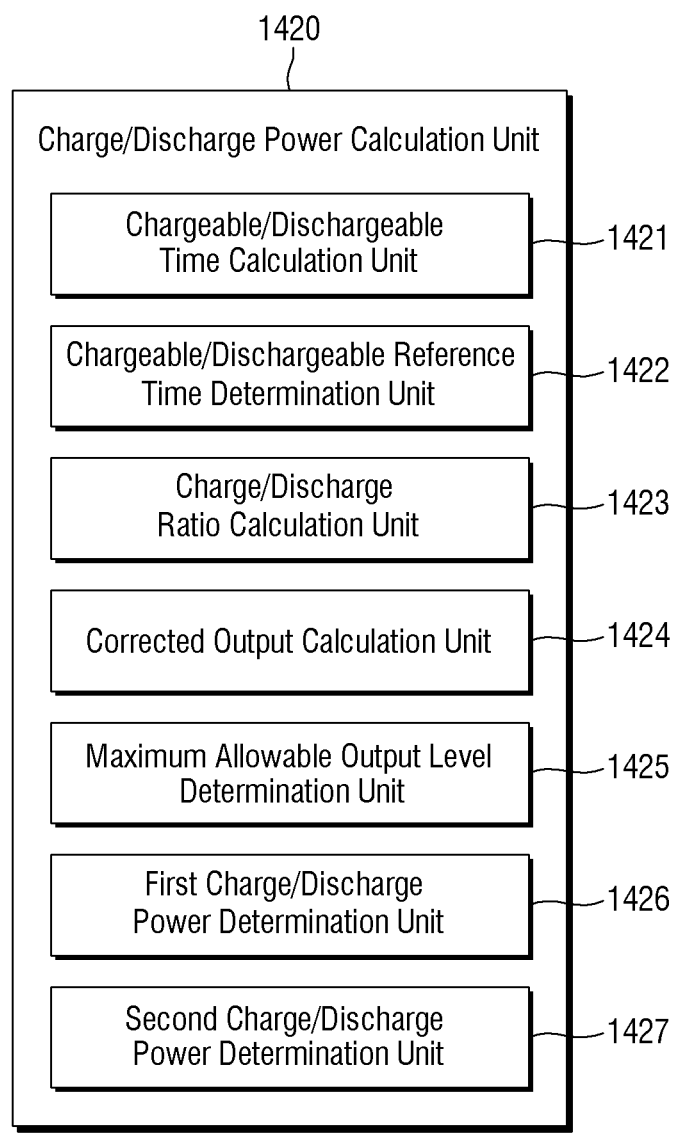
FIG. 7 is a diagram for illustrating the charge/discharge power calculation unit shown in FIG. 6.

FIG. 6 is a diagram for illustrating the integrated control unit shown in FIG. 1, and FIG. 7 is a diagram for illustrating the charge/discharge power calculation unit shown in FIG. 6.

Referring to FIG. 6, the integrated control unit 140 individually controls the plurality of DC/DC power conversion units 110 on the basis of state information including the SOC and SOH of each of the plurality of battery packs 120, additional information including a maximum allowable charge/discharge output level of each of the plurality of battery packs 120, and rated power of the AC/DC power conversion unit 130. Here, the integrated control unit 140 individually controls the plurality of DC/DC power conversion units 110 such that differences between full charge times or full discharge times of the plurality of battery packs are minimized, and in the most ideal case, the charge or discharge times of the battery packs 120 are the same as each other.

The integrated control unit 140 comprises a state information acquisition unit 1410, a charge/discharge power calculation unit 1420, and a charge/discharge power control unit 1430.

The state information acquisition unit 1410 acquires the state information including the SOC and SOH of each of the plurality of battery packs 120, the additional information including the maximum allowable charge/discharge output level of each of the plurality of battery packs 120, and the rated power of the AC/DC power conversion unit 130.

The state information and the additional information include at least one of a charge/discharge time such as a standard charge/discharge time according to the C-rate of the battery pack, the current SOH level (%), the current SOC level (%), the total number of the battery packs, and the maximum allowable charge/discharge output level indicating maximum chargeable and/or dischargeable power of the battery pack.

The status information and the additional information may be acquired from BMS information of the battery packs, specification data presented by manufacturers of battery packs for EVs, and the like, or some of the status information and the additional information may be acquired by the BMS 121 of the batteries for EVs, the control unit 141 provided in the DC/DC power conversion unit 110, the integrated control unit 140, and the like. Alternatively, the state information acquisition unit 1410 may acquire the maximum allowable charge/discharge output level determined by a user from the remote control unit 150.

The charge/discharge power calculation unit 1420 calculates charge/discharge power of each of the plurality of battery packs 120 on the basis of the state information and the additional information of each of the plurality of battery packs 120, and the rated power of the AC/DC power conversion unit 130.

Here, the charge/discharge power calculation unit 1420 calculates magnitudes of charge/discharge power of the plurality of DC/DC power conversion units 110 such that differences between full charge times or full discharge times of the plurality of battery packs 120 are minimized.

Referring to FIG. 7, the charge/discharge power calculation unit 1420 comprises a chargeable/dischargeable time calculation unit 1421, a chargeable/dischargeable reference time determination unit 1422, a charge/discharge ratio calculation unit 1423, a corrected output calculation unit 1424, a maximum allowable output level determination unit 1425, a first charge/discharge power determination unit 1426, and a second charge/discharge power determination unit 1427.

The chargeable/dischargeable time calculation unit 1421 calculates a chargeable/dischargeable time of each of the plurality of battery packs 120 on the basis of the SOH and SOC of each of the plurality of battery packs 120 included in the state information.

For example, when the time taken to charge one battery pack from 0% SOC to 100% SOC in the 100% SOH state of the battery pack is 100 minutes, and the current SOH and SoC of the battery pack are 50% and 30%, respectively, the chargeable/dischargeable time required to fully charge the battery pack may be calculated as 35 minutes. The calculation may be made using a known conventional method for calculating a chargeable/dischargeable time of a battery. Meanwhile, in order to extend the lifetime of a battery pack, an SOCmax level for maximum charge of the battery pack and an SOCmin level for maximum discharge of the battery pack may be determined. For example, the SOCmax level may be determined such that the SOC level is not greater than 90% when the battery pack is charged, or the SOCmin level may be determined such that the SOC level is not less than 10% when the battery pack is discharged. In this case, the chargeable/dischargeable time may be calculated in consideration of both the determined SOCmax and SOCmin levels.

The chargeable/dischargeable reference time determination unit 1422 determines a longest chargeable/dischargeable time among the calculated chargeable/dischargeable times of the plurality of battery packs as a chargeable/dischargeable reference time. This is to adjust the chargeable/dischargeable times of the remaining battery packs with respect to the chargeable/dischargeable time of the battery pack having the longest chargeable/dischargeable time.

The charge/discharge ratio calculation unit 1423 calculates a charge/discharge ratio of each of the plurality of battery packs by dividing the chargeable/dischargeable time of each of the plurality of battery packs by the chargeable/dischargeable reference time.

For example, when the chargeable/dischargeable time of a battery pack A having the longest chargeable/dischargeable time is 35 minutes and the chargeable/dischargeable time of another battery pack is B 17.5 minutes, the chargeable/dischargeable reference time is 35 minutes so that the charge/discharge ratio of the battery pack A is calculated as 100% and the charge/discharge ratio of the battery pack B is calculated as 50%.

The corrected output calculation unit 1424 calculates a corrected output level for each of the plurality of battery packs by multiplying the charge/discharge ratio of each of the plurality of battery packs and a value obtained by dividing the rated power of the AC/DC power conversion unit 130 by a sum of the charge/discharge ratios of the plurality of battery packs.

The maximum allowable output level determination unit 1425 determines whether the corrected output level calculated for each of the plurality of battery packs exceeds the maximum allowable charge/discharge output level determined for each of the plurality of battery packs. The maximum allowable charge/discharge output level is an independent variable determined by the user for safety of the battery pack, and should not be exceeded for safety while the battery pack is charged.

When the maximum allowable output level determination unit 1425 determines that the corrected output level for each of the plurality of battery packs does not exceed the maximum allowable charge/discharge output level determined for each of the plurality of battery packs, the first charge/discharge power determination unit 1426 determines the corrected output level of each of the plurality of battery packs as the charge/discharge power of each of the plurality of battery packs.

In this case, since the corrected output level of each of the plurality of battery packs does not exceed the maximum allowable charge/discharge output level determined for each of the battery packs, the corrected output level may be determined to be the charge/discharge power as it is.

When the corrected output level of at least one first battery pack among the corrected output levels of the plurality of battery packs exceeds the maximum allowable charge/discharge output level determined for each of the plurality of battery packs, the second charge/discharge power determination unit 1427 determines the maximum allowable charge/discharge output level of the at least one first battery pack as the charge/discharge power of the at least one first battery pack, and determines a value obtained by dividing power corresponding to a difference between the maximum allowable charge/discharge output level and the corrected output level of the at least one first battery pack by the number of at least one second battery pack other than the at least one first battery pack, and adding the divided power to the corrected output level of each of the at least one second battery pack, as the charge/discharge power of each of the at least one second battery pack.

That is, when the corrected output level of any one battery pack exceeds the maximum allowable charge/discharge output level determined for the battery pack, the second charge/discharge power determination unit 1427 causes the battery pack to be charged with e maximum allowable charge/discharge output level, and resulting surplus power equal to a difference between the maximum allowable charge/discharge output level and the corrected output level may be used to charge the remaining battery packs.

The charge/discharge power control unit 1430 controls the plurality of DC/DC power conversion units 110 on the basis of the charge/discharge power of each of the battery packs calculated by the charge/discharge power calculation unit 1420.

A conventional ESS has a problem that when any one battery pack is fully charged or fully discharged, the charge or discharge operation of the battery pack is stopped. According to the invention, the integrated control unit controls the DC/DC power conversion unit provided in each of the battery packs to minimize differences between full charge times or full discharge times of the battery packs, so that all the batteries may be fully charged or fully discharged and the efficient use of the battery packs is ensured.

Figure 8:
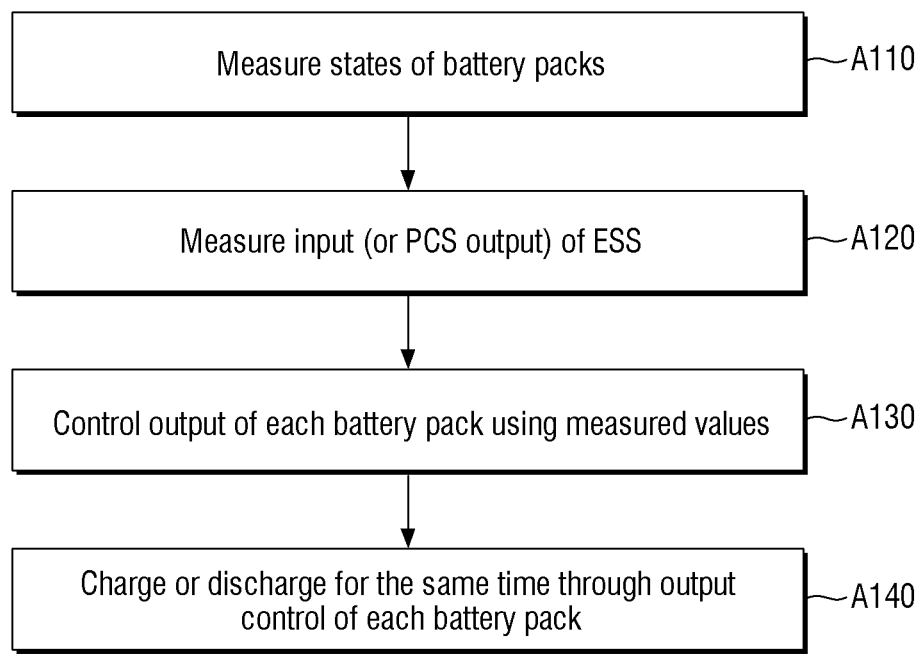
FIG. 8 is a diagram for illustrating a method for operating the ESS employing battery packs according to one embodiment of the invention.

FIG. 8 is a diagram for illustrating a method for operating the ESS employing battery packs according to one embodiment of the invention.

Referring to FIG. 8, the method comprises the steps of measuring the current states of the battery packs (A110), measuring the input of the ESS (A120), controlling the output of each of the battery packs using the measured values (A130), and operating each battery pack for the same time (A140).

In the step of measuring the current states of the battery packs (A110), the measurement may be performed using BMS information of the battery packs, specification data provided by manufacturers of the battery packs, and the like.

Measurements include charge/discharge times such as standard charge/discharge times according to the C-rates of the battery packs, the current SOH levels (%), the current SOC levels (%), the total number of the battery packs, the maximum allowable charge/discharge output levels indicating maximum chargeable and/or dischargeable power of the battery packs, and the like. These measurements are state information and additional information, which are necessary to calculate the charge/discharge power of each of the battery packs.

Some of the measurement values may be measured through the BMS 121 of the battery, the control unit 141 provided in the DC/DC power conversion unit 110, and the integrated control unit 140.

In the step of measuring the input of the ESS (A120), the rated power (or PCS output level) of the AC/DC power conversion unit 130 is measured. The rated power (or PCS output level) serves as a reference required for the output control of each battery pack, and the rated output level may be a value measured by the integrated control unit 140 or the PMS or EMS. Main information required for the output control of the battery pack is the current state of the battery pack, and may be acquired through various routes.

In the step of controlling the output of each battery pack using the measured values (A130), the following steps are performed.

1. The chargeable/dischargeable time (e.g., chargeable time, dischargeable time, or the like) of each battery pack is calculated using the basic information and the additional information, which are the measured values acquired in the steps A110 and A120. Here, the chargeable/dischargeable time is calculated using the charge/discharge time, the current SOH level (%), and the current SOC level (%).
2. The charge/discharge ratio is calculated by calculating the charge/discharge time of each battery pack as a percentage with respect to the charge/discharge time of the battery pack having the longest charge/discharge time.
3. The corrected output level for each of the plurality of battery packs is calculated as an equally subdivided power level using the charge/discharge ratio of each battery pack calculated as a percentage and the rated power (or PCS output level) of the AC/DC power conversion unit 130.

Specifically, the charge/discharge ratio of each of the plurality of battery packs is divided by a sum of the charge/discharge ratios of the plurality of battery packs and multiplied by the rated power (or PCS output level) of the AC/DC power conversion unit 130 to calculate the corrected output level for each of the plurality of battery packs.

4. It is determined whether the corrected output level calculated for each of the plurality of battery packs exceeds the maximum allowable charge/discharge output level, which is a maximum chargeable and/or dischargeable power limit level determined for the battery pack. When the corrected output level calculated for each of the plurality of battery packs is smaller than the maximum allowable charge/discharge output level determined for each of the plurality of battery packs, the corrected output level is determined as the charge/discharge power, and the output of DC/DC power conversion unit 110 is adjusted to the determined charge/discharge power.

Further, when the corrected output level calculated for any one of the plurality of battery packs is greater than the maximum allowable charge/discharge output level determined for the battery pack, the maximum allowable charge/discharge output level of the battery pack is determined as the charge/discharge power of the battery pack, and power corresponding to a difference between the maximum allowable charge/discharge output level and the corrected output level of the battery pack is distributed to the remaining battery packs.

Furthermore, when the corrected output level calculated for any one of the plurality of battery packs is less than the maximum allowable charge/discharge output level determined for the battery pack, the corrected output level of each spent EV battery pack may be recalculated to have the same value as the input value (or PCS output level) of the ESS.

In the step of operating each battery pack for the same time (A140), the operation is performed after the output of the battery pack is controlled in the manner as above.

In this case, since charge or discharge is performed with the corrected output regardless of the states of the battery packs, differences between full charge times or full discharge times of the battery packs may be minimized.

Further, when the SOH and SOC are changed according to the internal calculation of the BMS during every charge or discharge, the integrated control unit 140 may read the measured values at regular time intervals and change the output control of each battery pack. Such continuous iterative calculation and control enable efficient operation according to the continuous state changes of the battery packs.

The remote control unit 150 is intended for control and operation, and may be provided as an arithmetic processing device such as a computer having a UI program or the like installed therein. The remote control unit 150 may determine various independent variables such as maximum charge/discharge power of the battery packs and maximum SOC levels and minimum SOC levels of the battery packs.

Figure 9A:
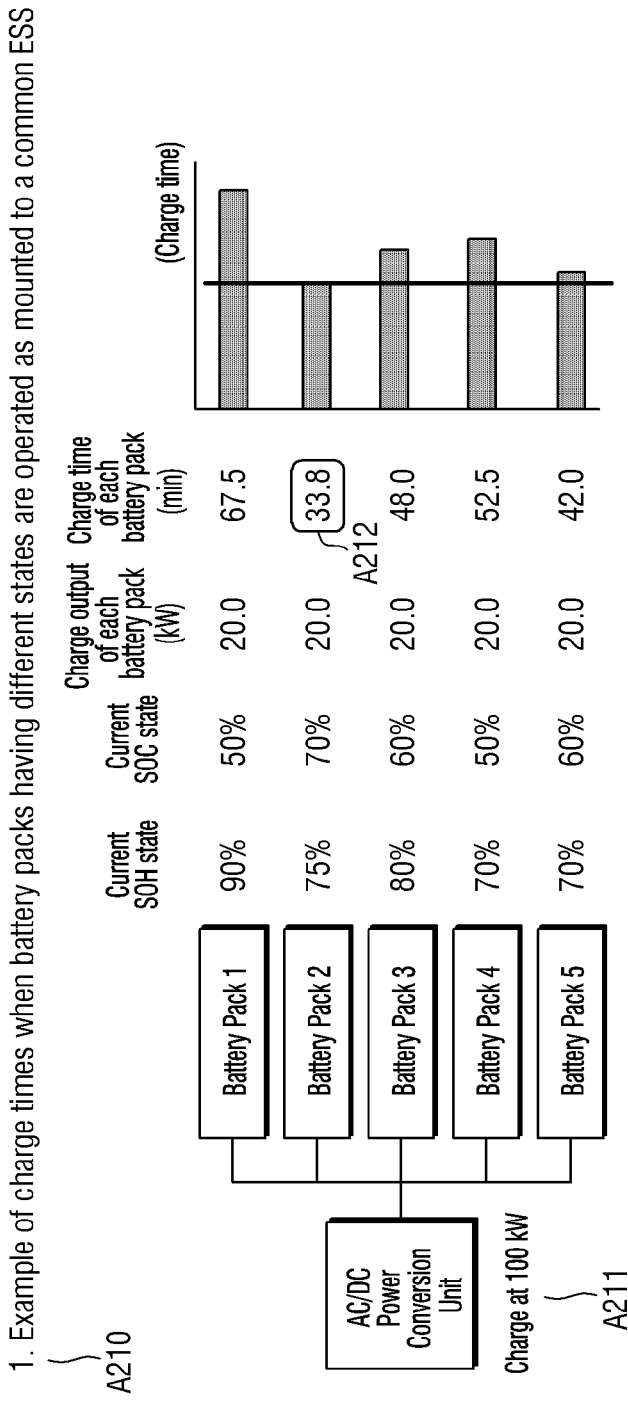
FIGS. 9A to 9C are diagrams for illustrating examples of the ESS operating method shown in FIG. 8.
Figure 9B:
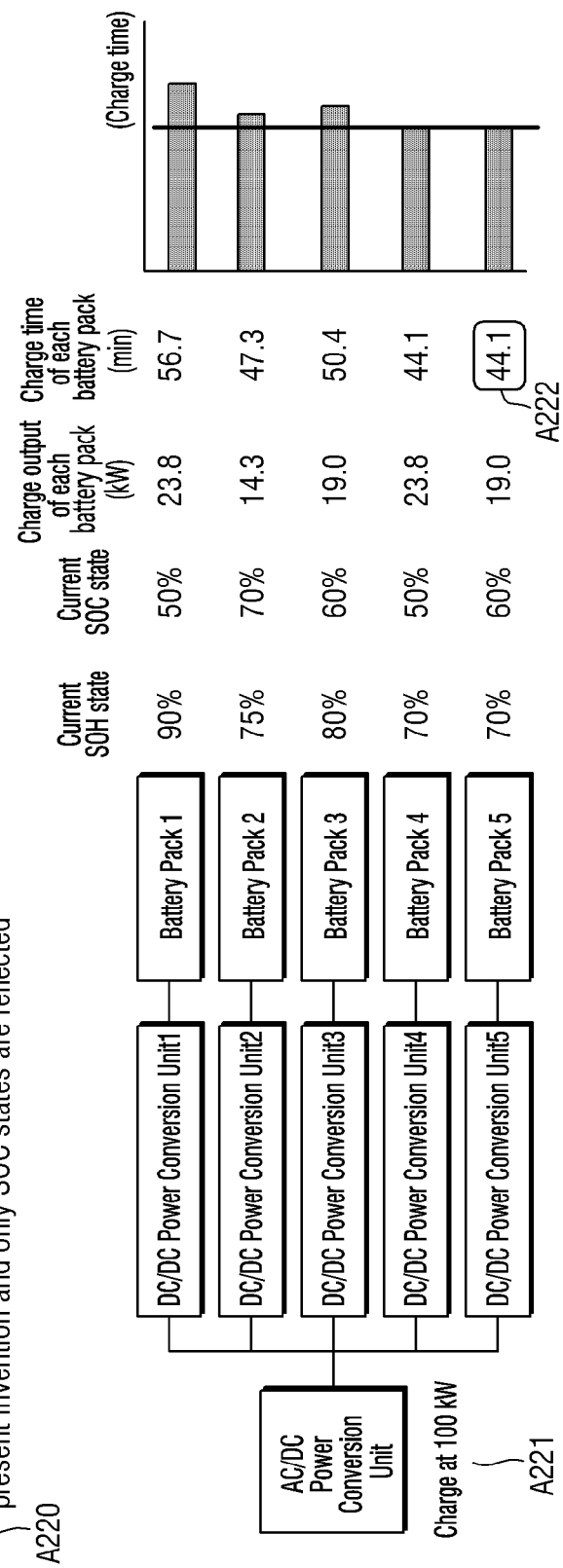
Figure 9C:
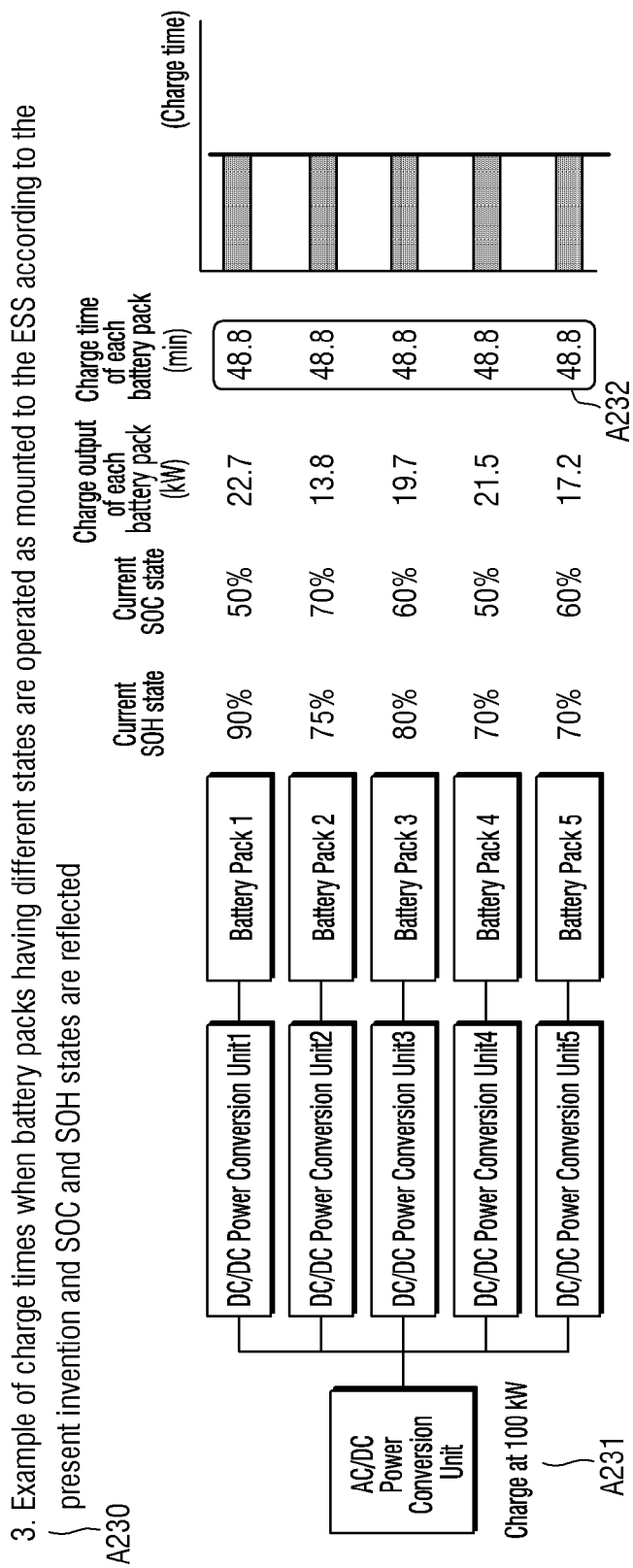

FIGS. 9A to 9C are diagrams for illustrating examples of the ESS operating method shown in FIG. 8.

Referring to FIG. 9A, the first example (A210) relates to a conventional ESS, which cannot control the output of each battery pack so that each battery pack has to be charged with the same output. Since the conventional ESS does not consider the states of SOH and SOC at all, it is highly likely that the operation time is determined with respect to the battery pack having the lowest SOC in general.

Referring to FIG. 9B, in the second example (A220), when the ESS according to the invention calculates the chargeable time of each battery pack in consideration of only the SOC of the battery pack, it is highly likely that the operation time is determined with respect to the battery pack having the lowest SOH, because the operation time according to the SOH is not reflected. That is, the difference in the operation time of each battery pack cannot be minimized when the SOH is not reflected. It can be seen that the SOC of the battery pack is related to the chargeable/dischargeable time, and the actual charge/discharge time varies depending on the state of the SOH.

One or more battery packs having different SOHs have different SOCs during charge and discharge due to the different SOHs even if the SOCs are adjusted and matched. Therefore, it can be seen that the SOC matching has a limitation in the operation time in connection with the technique of connecting and operating one or more battery packs with different SOHs in combination.

Referring to FIG. 9C, the third example (A230) relates to the ESS according to the invention, wherein one or more battery packs having different SOHs and SOCs are operated with different charge outputs on the basis of the states of the battery packs, so that differences between full charge times or full discharge times of the battery packs may be minimized.

In the first example, the ESS charges battery packs 1 to 5 for 33.8 minutes (A212) in the case of 100 kW charge (A211). Here, the battery packs 1, 3, 4, and 5 except for the battery pack 2 are not fully charged.

In the second example in which only the SOC condition is reflected in the present invention (A220), the ESS charges the battery packs 1 to 4 for 44.1 minutes (A222) in the case of 100 kW charge (A221). Here, the battery packs 1 to 3 except for the battery packs 4 and 5 are not fully charged.

In the third example in which both the SOC and SOH conditions are reflected in the present invention (A230), the battery packs 1 to 5 are charged for 48.8 minutes (A232) in the case of 100 kW charge (A231). Here, all of the battery packs 1 to 5 are fully charged.

The ESS according to the invention operates as both the SOH and SOC conditions of the battery packs are reflected as in the third example, so that the most efficient operation is enabled.

Figure 10:
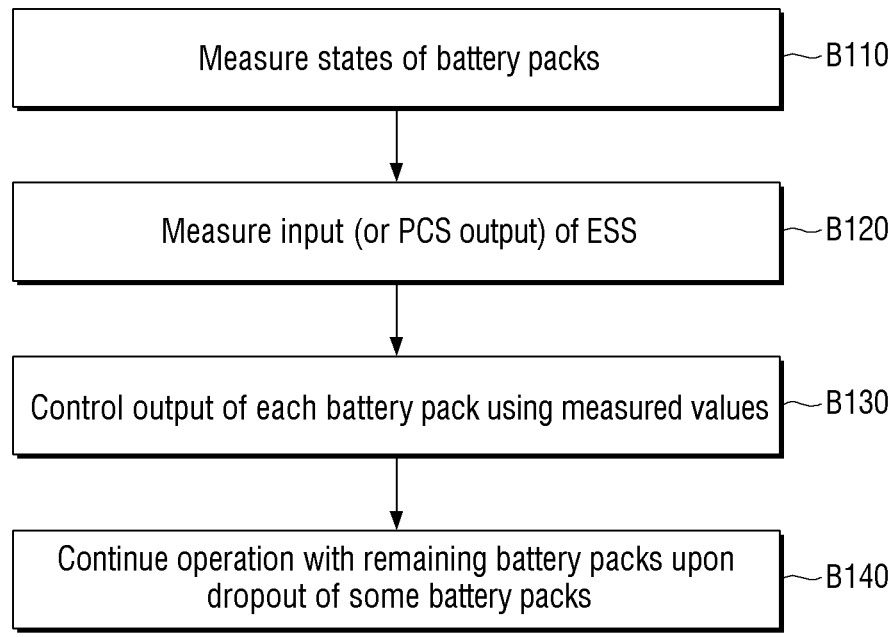
FIG. 10 is a diagram for illustrating a method for operating the ESS with remaining battery packs upon dropout of some batteries according to one embodiment of the invention.
Figure 11:
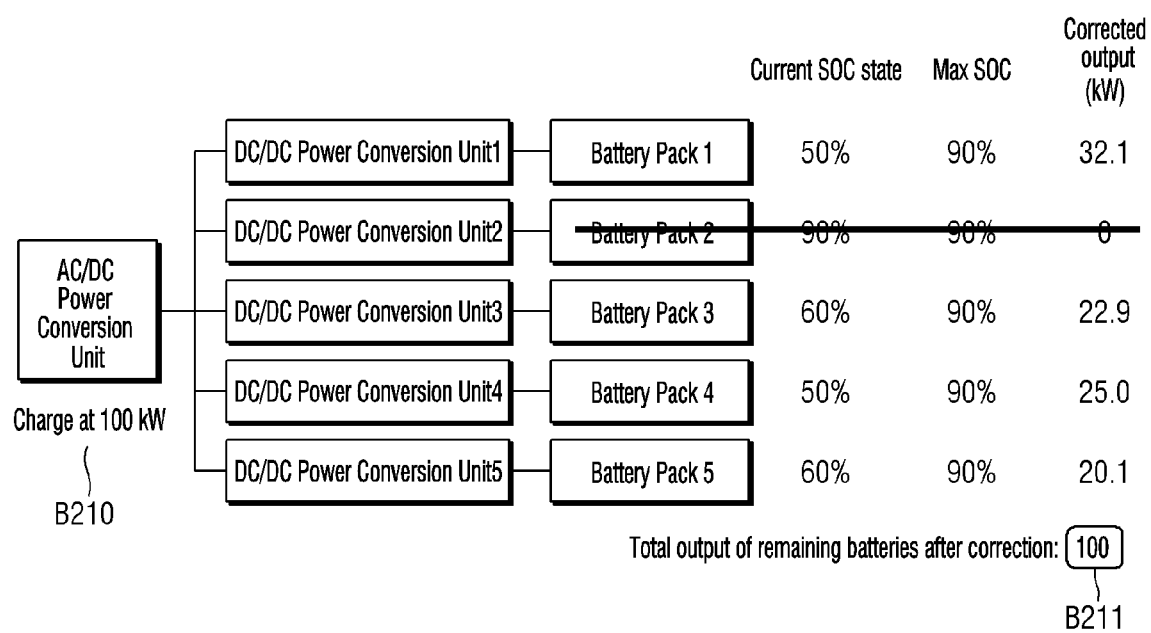
FIG. 11 is a diagram for illustrating an example of the method for operating the ESS with the remaining battery packs shown in FIG. 10.

FIG. 10 is a diagram for illustrating a method for operating the ESS with remaining battery packs upon dropout of some batteries according to one embodiment of the invention, and FIG. 11 is a diagram for illustrating an example of the method for operating the ESS with the remaining battery packs shown in FIG. 10.

Referring to FIG. 10, the cases in which a battery pack is dropped out encompass a variety of cases in which no operation can be involved, such as the cases in which the battery is out of its management range, the battery pack cannot be used due to its inherent problem, the use of the battery pack is suspended by an operator, and the like.

The method for operating with the remaining battery packs upon dropout of some batteries comprises the steps of measuring the current states of the battery packs (B110), measuring the input (or PCS output) of the ESS (B120), controlling the output of each of the battery packs using the measured values (B130), and operating with the remaining battery packs (B140).

In the step of measuring the current states of the battery packs (B110), the measurement may be performed using information of the battery packs, specification data BMS provided by manufacturers of the battery packs, and the like, and the current states of the battery packs may be measured in the following order.

First, in the step of measuring the current states of the battery packs (B110), the measurement may be performed using BMS information of the battery packs, specification data provided by manufacturers of the battery packs, and the like.

Measurements include charge/discharge times such as standard charge/discharge times according to the C-rates of the battery packs, the current SOH levels (%), the current SOC levels (%), the total number of the battery packs, the maximum allowable charge/discharge output levels indicating maximum chargeable and/or dischargeable power of the battery packs, and the like. These measurements are state information and additional information, which are necessary to calculate the charge/discharge power of each of the battery packs.

Some of the measurement values may be measured through the BMS 121 of the battery, the control unit 141 provided in the DC/DC power conversion unit 110, and the integrated control unit 140.

In the step of measuring the input of the ESS (B120), the rated power (or PCS output level) of the AC/DC power conversion unit 130 is measured. The rated power (or PCS output level) serves as a reference required for the output control of each battery pack, and the rated output level may be a value measured by the integrated control unit 140 or the PMS or EMS. Main information required for the output control of the battery pack is the current state of the battery pack, and may be acquired through various routes.

The step of controlling the output of each battery pack using the measured values (B130) comprises the following steps.
1. It is determined whether each battery pack is within a charge or discharge SOC management range using the measured values acquired in the steps B110 and B120, and when a battery pack is out of the range, the battery pack is determined to be dropped out and the remaining battery packs are identified.
2. The chargeable/dischargeable time (e.g., chargeable time, dischargeable time, or the like) of each of the remaining battery packs except for the dropped battery pack is calculated using the basic information and the additional information, which are the measured values acquired for each battery pack. Here, the chargeable/dischargeable time is calculated using the charge/discharge time, the current SOH level (%), and the current SOC level (%).
3. The charge/discharge ratio is calculated by calculating the charge/discharge time of each battery pack as a percentage with respect to the charge/discharge time of the battery pack having the longest charge/discharge time.
4. The corrected output level is calculated as an equally subdivided power level using the charge/discharge ratio of each battery pack calculated as a percentage and the rated power (or PCS output level).

Specifically, the charge/discharge ratio of each of the plurality of battery packs is divided by a sum of the charge/discharge ratios of the plurality of battery packs and multiplied by the rated power (or PCS output level) to calculate the corrected output level for each of the plurality of battery packs.

5. It is determined whether the corrected output level calculated for each of the plurality of battery packs exceeds the maximum allowable charge/discharge output level, which is a maximum chargeable and/or dischargeable power limit level determined for the battery pack. When the corrected output level calculated for each of the plurality of battery packs is smaller than the maximum allowable charge/discharge output level determined for each of the plurality of battery packs, the corrected output level is determined as the charge/discharge power, and the output of DC/DC power conversion unit 110 is adjusted to the determined charge/discharge power.

Further, when the corrected output level calculated for any one of the plurality of battery packs is greater than the maximum allowable charge/discharge output level determined for the battery pack, the maximum allowable charge/discharge output level of the battery pack is determined as the charge/discharge power of the battery pack, and power corresponding to a difference between the maximum allowable charge/discharge output level and the corrected output level of the battery pack is distributed to the remaining battery packs.

In the step of continuing operation with the remaining battery packs upon dropout of some battery packs (B140), continuous operation is possible when the operation is performed after the output of the remaining battery packs is controlled even if some battery packs are dropped out. Since charge or discharge is performed with the corrected output regardless of the states of the battery packs, each battery pack may be operated for the same operation time.

Further, the SOH and SOC are changed according to the internal calculation of the BMS during every charge or discharge, and the integrated control unit 140 may read the measured values at regular time intervals and change the output control of each battery pack. Such continuous iterative calculation and control enable efficient operation according to the continuous state changes of the battery packs.

Referring to FIG. 11, it is shown that the battery pack 2 is dropped out during operation. The ESS is operated using the remaining four battery packs.

When the ESS is charged at 100 kW (B210), it can be seen that the operation is enabled by correcting the output to satisfy the charge condition of 100 KW (B210) using the remaining four battery packs even though the one battery pack is dropped out.

A common ESS stops operation when one battery pack is dropped out during the operation, and may be operated only after the dropped battery pack returns to a normal state.

The ESS according to the invention may be operated individually for each battery pack using the DC/DC power conversion units, and thus may be operated in a desired manner even in various states.

Figure 12:
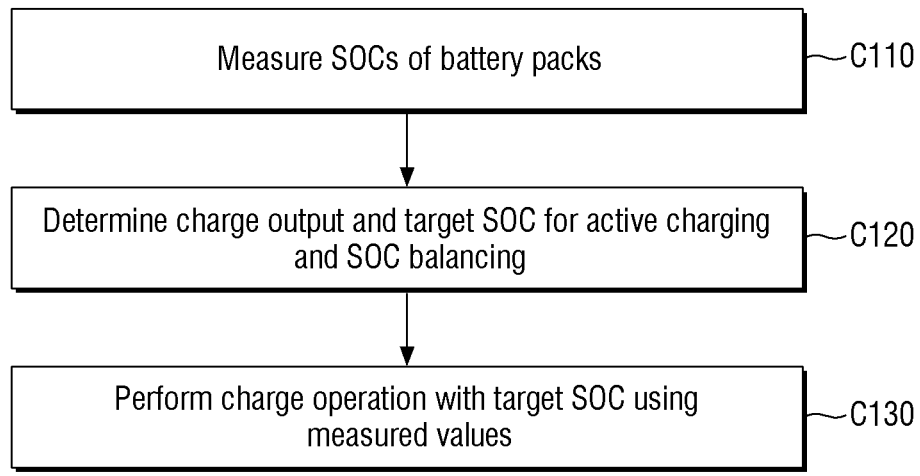
FIG. 12 is a diagram for illustrating a method for active charging and SOC balancing with respect to a battery pack having the highest SOC when the SOCs of one or more battery packs according to one embodiment of the invention are different.

FIG. 12 is a flowchart of a method for active charging and SOC balancing with respect to a battery pack having the highest SOC when the SOCs of one or more battery packs according to one embodiment of the invention are different.

In FIG. 12, the components performing the respective steps are the control unit 141 and the integrated control unit 140.

As shown in FIG. 12, the active charging and SOC balancing method using the DC/DC power conversion units 110 according to the invention comprises the steps of measuring the current of the battery packs (C110), determining the SOCs and the inputs to be charged (C120), and performing a charge operation for each battery pack using the determined values (C130).

First, in the step of measuring the current SOC states of the battery packs, the measurement may be performed using BMS information of the battery packs, and the output control of each battery pack may be performed in the following order.
1. The current SOC state of each battery pack is measured (C110).
2. The battery pack having the highest SOC and the corresponding SOC level are selected, and the charge target level is determined (C120).
3. The remaining spent EV battery packs except for the battery pack having the target SOC are operated with the target charge power (C130).

Figure 13:
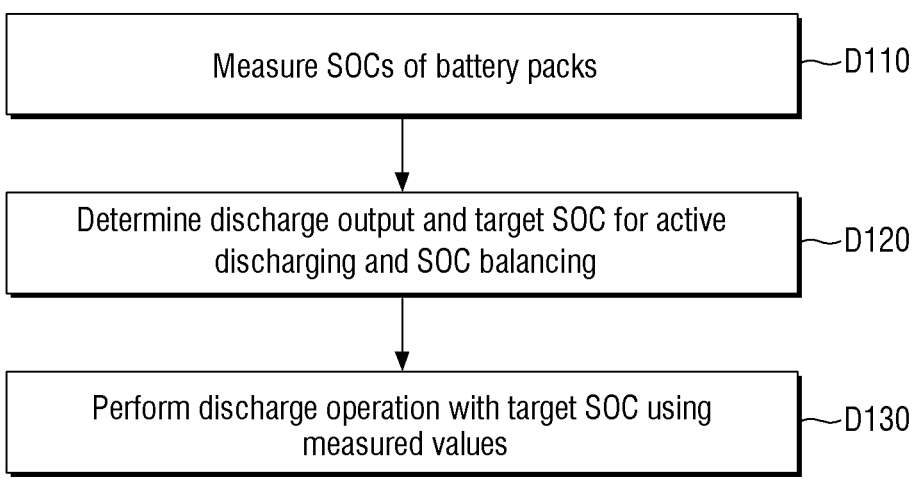
FIG. 13 is a diagram for illustrating a method for active discharging and SOC balancing with respect to a battery pack having the lowest SOC when the SOCs of one or more battery packs according to one embodiment of the invention are different.

FIG. 13 is a diagram for illustrating a method for active discharging and SOC balancing with respect to a battery pack having the lowest SOC when the SOCs of one or more battery packs according to one embodiment of the invention are different.

In FIG. 13, the components performing the respective steps are the control unit 141 and the integrated control unit 140.

Referring to FIG. 13, the active discharging and SOC balancing method according to the invention comprises the steps of measuring the current SOC states of the battery packs (D110), determining the SOCs and the inputs to be discharged (D120), and performing a discharge operation for each battery pack using the determined values (D130).

First, in the step of measuring the current SOC state of each battery pack (D110), the measurement may be performed using BMS information of the battery pack, and the output control of each battery pack may be performed in the following order.
1. The current SOC state of each battery pack is measured (D110).
2. The battery pack having the lowest SOC and the corresponding SOC level are selected, and the discharge target level is determined (D120).
3. The remaining battery packs except for the battery pack having the target SOC are operated with the target discharge power (D130).

Figure 14:
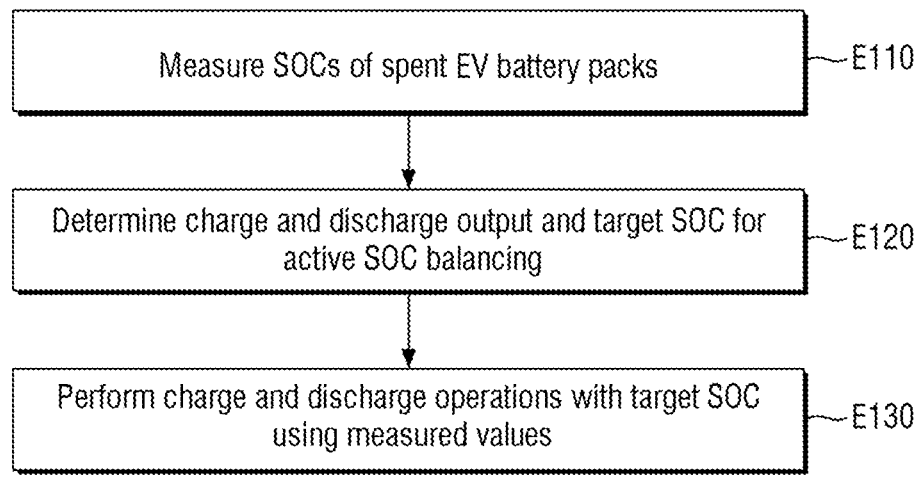
FIG. 14 is a diagram for illustrating a method for active SOC balancing with respect to a battery pack having an intermediate SOC when the SOCs of one or more battery packs according to one embodiment of the invention are different.

FIG. 14 is a flowchart of a method for active SOC balancing with respect to a spent EV battery pack having an intermediate SOC when the SOCs of one or more spent EV battery packs according to one embodiment of the invention are different.

In FIG. 14, the components performing the respective steps are the control unit 141 and the integrated control unit 140.

As shown in FIG. 14, the active SOC balancing method using charge and discharge according to the invention comprises the steps of measuring the current SOC states of the battery packs (E110), determining the SOCs and the inputs to be charged and discharged (E120), and performing charge and discharge operations for each battery pack using the determined values (E130).

As for the SOC of an intermediate level shown in FIG. 14, the user may personally select the SOC level of the battery pack for SOC balancing, and an intermediate SOC level among the entire SOC levels may be selected since charge and discharge are performed in general.

First, in the step of measuring the current SOC state of each battery pack (E110), the measurement may be performed using BMS information of the battery pack, and the output control of each battery pack may be performed in the following order.
1. The current SOC state of each battery pack is measured (E110).
2. The battery pack having the lowest SOC and the corresponding SOC level are selected, and the charge and discharge target levels are determined (E120).
3. The remaining spent EV battery packs except for the battery pack having the target SOC are operated with the target charge and discharge power (E130).

Although the present invention has been described with reference to the embodiments shown in the drawings, the embodiments are merely exemplary and those skilled in the art will understand that various modifications and other equivalent embodiments may be made therefrom. Therefore, the true technical scope of the invention should be determined by the technical spirit of the appended claims.

What is claimed is:

1. An energy storage system employing battery packs, comprising:
a plurality of battery packs;
a plurality of DC/DC power conversion units configured to adjust magnitudes of charge power and discharge power of each of the plurality of battery packs;
an AC/DC power conversion unit configured to convert discharge power discharged through the plurality of DC/DC power conversion units into AC power and provide the AC power to a grid or a load, or convert charge power coming from the grid into DC power and provide the DC power to the plurality of DC/DC power conversion units; and
an integrated control unit configured to individually control the plurality of DC/DC power conversion units on the basis of state information including a state of charge (SOC) and a state of health (SOH) of each of the plurality of battery packs, additional information including a maximum allowable charge/discharge output level of each of the plurality of battery packs, and rated power of the AC/DC power conversion unit,
wherein the integrated control unit is configured to individually control the plurality of DC/DC power conversion units to minimize differences between full charge times or full discharge times of the plurality of battery packs,
wherein the integrated control unit is configured to calculate a corrected output level for each of the plurality of battery packs on the basis of the SOC and SOH of each of the plurality of battery packs and the rated power of the AC/DC power conversion unit, and determine the corrected output level as charge/discharge power of each of the plurality of battery packs, and
wherein in response to the corrected output level of at least one first battery pack among the plurality of battery packs exceeding the maximum allowable charge/discharge output level of the first battery pack, the maximum allowable charge/discharge output level of the at least one first battery pack is determined as the charge/discharge power of the at least one first battery pack, and the charge/discharge power of at least one second battery pack other than the at least one first battery pack among the plurality of battery packs is determined by distributing power corresponding to a difference between the maximum allowable charge/discharge output level and the corrected output level of the at least one first battery pack to the corrected output level of each of the at least one second battery pack.

2. The energy storage system of claim 1, wherein the integrated control unit comprises:
a state information acquisition unit configured to acquire the state information and additional information of each of the plurality of battery packs, and the rated power of the AC/DC power conversion unit;
a charge/discharge power calculation unit configured to calculate the charge/discharge power of each of the plurality of battery packs on the basis of the state information and additional information of each of the plurality of battery packs, and the rated power of the AC/DC power conversion unit; and
a charge/discharge power control unit configured to control the plurality of DC/DC power conversion units on the basis of the calculated charge/discharge power of each of the plurality of battery packs.

3. The energy storage system of claim 2, wherein the charge/discharge power calculation unit comprises:
a chargeable/dischargeable time calculation configured to calculate a chargeable/dischargeable time of each of the plurality of battery packs on the basis of the SOH and SOC of each of the plurality of battery packs;
a chargeable/dischargeable reference time determination unit configured to determine a longest chargeable/dischargeable time among the chargeable/dischargeable times of the plurality of battery packs as a chargeable/dischargeable reference time;
a charge/discharge ratio calculation unit configured to calculate a charge/discharge ratio of each of the plurality of battery packs by dividing the chargeable/dischargeable time of each of the plurality of battery packs by the chargeable/dischargeable reference time;

a corrected output calculation unit configured to calculate the corrected output level for each of the plurality of battery packs by multiplying the charge/discharge ratio of each of the plurality of battery packs and a value obtained by dividing the rated power of the AC/DC power conversion unit by a sum of the charge/discharge ratios of the plurality of battery packs;

a maximum allowable output level determination unit configured to determine whether the corrected output level calculated for each of the plurality of battery packs exceeds the maximum allowable charge/discharge output level determined for each of the plurality of battery packs; and a first charge/discharge power determination unit configured to, in response to determining that the corrected output level of each of the plurality of battery packs does not exceed the maximum allowable charge/discharge output level of each of the plurality of battery packs, determine the corrected output level of each of the plurality of battery packs as the charge/discharge power of each of the plurality of battery packs.

4. The energy storage system of claim 3, wherein the charge/discharge power calculation unit further comprises:

a second charge/discharge power determination unit configured to, in response to determining that the corrected output level of at least one first battery pack among the corrected output levels of the plurality of battery packs exceeds the maximum allowable charge/discharge output level determined for each of the plurality of battery packs, determine the maximum allowable charge/discharge output level of the at least one first battery pack as the charge/discharge power of the at least one first battery pack, and determine a value obtained by adding the corrected output level of at least one second battery pack other than the at least one first battery pack and power corresponding to a difference between the maximum allowable charge/discharge output level and the corrected output level of the at least one first battery pack as the charge/discharge power of the at least one second battery pack.

5. The energy storage system of claim 1, wherein the integrated control unit is configured to, in response to determining that charge/discharge of at least one third battery pack among the plurality of battery packs is impossible, calculate the charge/discharge power of each of the remaining battery packs other than the third battery pack, and control the plurality of DC/DC power conversion units on the basis of the calculated charge/discharge power of each of the battery packs.

* * * * *